US011288200B2

(12) United States Patent
Mallory

(10) Patent No.: US 11,288,200 B2
(45) Date of Patent: Mar. 29, 2022

(54) METHOD AND SYSTEM FOR TASK-BASED CACHE ISOLATION

(71) Applicant: BLACKBERRY LIMITED, Waterloo (CA)

(72) Inventor: Adam Taylor Mallory, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 16/970,850

(22) PCT Filed: Mar. 6, 2018

(86) PCT No.: PCT/IB2018/051444
§ 371 (c)(1),
(2) Date: Aug. 18, 2020

(87) PCT Pub. No.: WO2019/171131
PCT Pub. Date: Sep. 12, 2019

(65) Prior Publication Data
US 2021/0089463 A1    Mar. 25, 2021

(51) Int. Cl.
*G06F 12/08* (2016.01)
*G06F 12/0895* (2016.01)
*G06F 12/0842* (2016.01)
*G06F 12/0846* (2016.01)
*G06F 12/0871* (2016.01)

(52) U.S. Cl.
CPC ...... *G06F 12/0895* (2013.01); *G06F 12/0842* (2013.01); *G06F 12/0848* (2013.01); *G06F 12/0871* (2013.01)

(58) Field of Classification Search
CPC ............. G06F 12/0895; G06F 12/0842; G06F 12/0848; G06F 12/0871
See application file for complete search history.

(56) References Cited

U.S. PATENT DOCUMENTS 6,115,793 A    9/2000   Gruber et al.
9,934,152 B1   4/2018   Bryant et al.
(Continued)

OTHER PUBLICATIONS

H. Fröning and H. Litz, "Efficient hardware support for the Partitioned Global Address Space," 2010 IEEE International Symposium on Parallel & Distributed Processing, Workshops and Phd Forum (IPDPSW), 2010, pp. 1-6.*
(Continued)

*Primary Examiner* — Pierre Miche Bataille
(74) *Attorney, Agent, or Firm* — Perry + Currier

(57) ABSTRACT

A method of task-based cache isolation includes: storing, in association with a cache controller, (i) a plurality of mask descriptors representing respective portions of a cache memory, and (ii) for each mask descriptor, a mask identifier; receiving, at the cache controller, a memory transaction request containing a memory address and an active one of the mask identifiers; retrieving, at the cache controller, an active one of the mask descriptors corresponding to the active mask identifier; generating, based on the memory address and the active mask descriptor, an index identifier corresponding to a cache element within the portion of the cache memory represented by the active mask descriptor; and applying the memory transaction to the cache memory at the index identifier.

21 Claims, 6 Drawing Sheets

(56) References Cited

U.S. PATENT DOCUMENTS

| | | | | |
|---|---|---|---|---|
| 2002/0069339 A1* | 6/2002 | Lasserre | ............. | G06F 12/1027 |
| | | | | 711/201 |
| 2006/0294300 A1* | 12/2006 | Lubbers | ............. | H04L 67/2819 |
| | | | | 711/113 |
| 2014/0201452 A1* | 7/2014 | Meredith | ............. | G06F 12/128 |
| | | | | 711/130 |
| 2016/0239378 A1* | 8/2016 | Blake | ...................... | G06F 30/39 |

OTHER PUBLICATIONS

"IEEE Standard Control and Status Register (CSR) Architecture for Microcomputer Buses," in IEEE Std 1212-1991 , vol. No., pp. 1-144, Jul. 28, 1992.*

N. Neves, P. Tomás and N. Roma, "Adaptive In-Cache Streaming for Efficient Data Management," in IEEE Transactions on Very Large Scale Integration (VLSI) Systems, vol. 25, No. 7, pp. 2130-2143, Jul. 2017.*

"ISO/IEC/IEEE International Standard—Information Technology—Microprocessor Systems—Futurebus+(R)—Logical Protocol specification," in ANSI/IEEE Std 896.1-1994, , vol. No., pp. 1-208, Apr. 27, 1994.*

ISA/CA, International Search Report and Written Opinion, dated Aug. 1, 2018, re PCT International Patent Application No. PCT/IB2018/051444.

* cited by examiner

METHOD AND SYSTEM FOR TASK-BASED CACHE ISOLATION

FIELD

The specification relates generally to the management of cache memory in processors, and specifically to a method and system for task-based cache isolation.

BACKGROUND

Computing devices generally include a cache memory associated or integrated with a central processing units (CPU, or processor), in the form of one or more storage circuits that are faster than, and physically closer to the processor than, a main memory of the relevant computing device. For example, the cache may be implemented as one or more blocks of storage hardware on the same die as the processor itself.

Cache is typically significantly smaller than main memory. Various mechanisms therefore exist not only for writing data into cache for access by the processor, but also for evicting data previously placed in the cache to release storage space for current or future use by the processor. When deployed in connection with certain tasks, such as safety-critical tasks (e.g. certain tasks related to self-driving vehicle control), the above-mentioned mechanisms may evict from cache data required by a safety-critical task. The resulting delay imposed on the safety-critical task may lead to an undesirable decrease in performance of the safety-critical task.

The eviction of safety-critical data from cache may be avoided by locking portions of the cache known to contain the safety-critical data. However, as computing systems grow in complexity, the range of data that may be considered safety-critical grows. Further, as memory management system grow in performance and complexity, it may become difficult or impossible to predict the location in cache at which safety-critical data resides.

Thus, the conventional locking of portions of cache to safeguard safety-critical data in mixed-criticality applications, implement security restrictions and the like, may lead to one or both of insufficient protection of cache contents and decreased cache performance.

SUMMARY

An aspect of the specification provides a method of task-based cache isolation, comprising: storing; in association with a cache controller, (i) a plurality of mask descriptors representing respective portions of a cache memory, and (ii) for each mask descriptor, a mask identifier; receiving, at the cache controller, a memory transaction request containing a memory address and an active one of the mask identifiers; retrieving, at the cache controller, an active one of the mask descriptors corresponding to the active mask identifier; generating, based on the memory address and the active mask descriptor, an index identifier corresponding to a cache element within the portion of the cache memory represented by the active mask descriptor; and applying the memory transaction to the cache memory at the index identifier.

A further aspect of the specification provides a system for task-based cache isolation, comprising: a cache memory; a mask storage device storing (i) a plurality of mask descriptors representing respective portions of a cache memory, and (ii) for each mask descriptor, a mask identifier; a cache controller connected with the cache memory and the mask storage device, the cache controller configured to: receive a memory transaction request containing a memory address and an active one of the mask identifiers; retrieve an active one of the mask descriptors corresponding to the active mask identifier; generate, based on the memory address and the active mask descriptor; an index identifier corresponding to a cache element within the portion of the cache memory represented by the active mask descriptor; and apply the memory transaction to the cache memory at the index identifier.

A further aspect of the specification provides a non-transitory computer-readable storage medium storing a plurality of instructions for execution by a cache controller to perform a method of task-based cache isolation, the method comprising: storing, in association with a cache controller, (i) a plurality of mask descriptors representing respective portions of a cache memory, and (ii) for each mask descriptor, a mask identifier; receiving, at the cache controller, a memory transaction request containing a memory address and an active one of the mask identifiers; retrieving, at the cache controller, an active one of the mask descriptors corresponding to the active mask identifier; generating, based on the memory address and the active mask descriptor, an index identifier corresponding to a cache element within the portion of the cache memory represented by the active mask descriptor; and applying the memory transaction to the cache memory at the index identifier.

BRIEF DESCRIPTIONS OF THE DRAWINGS

Embodiments are described with reference to the following figures, in which.

DETAILED DESCRIPTION

Figure 1:
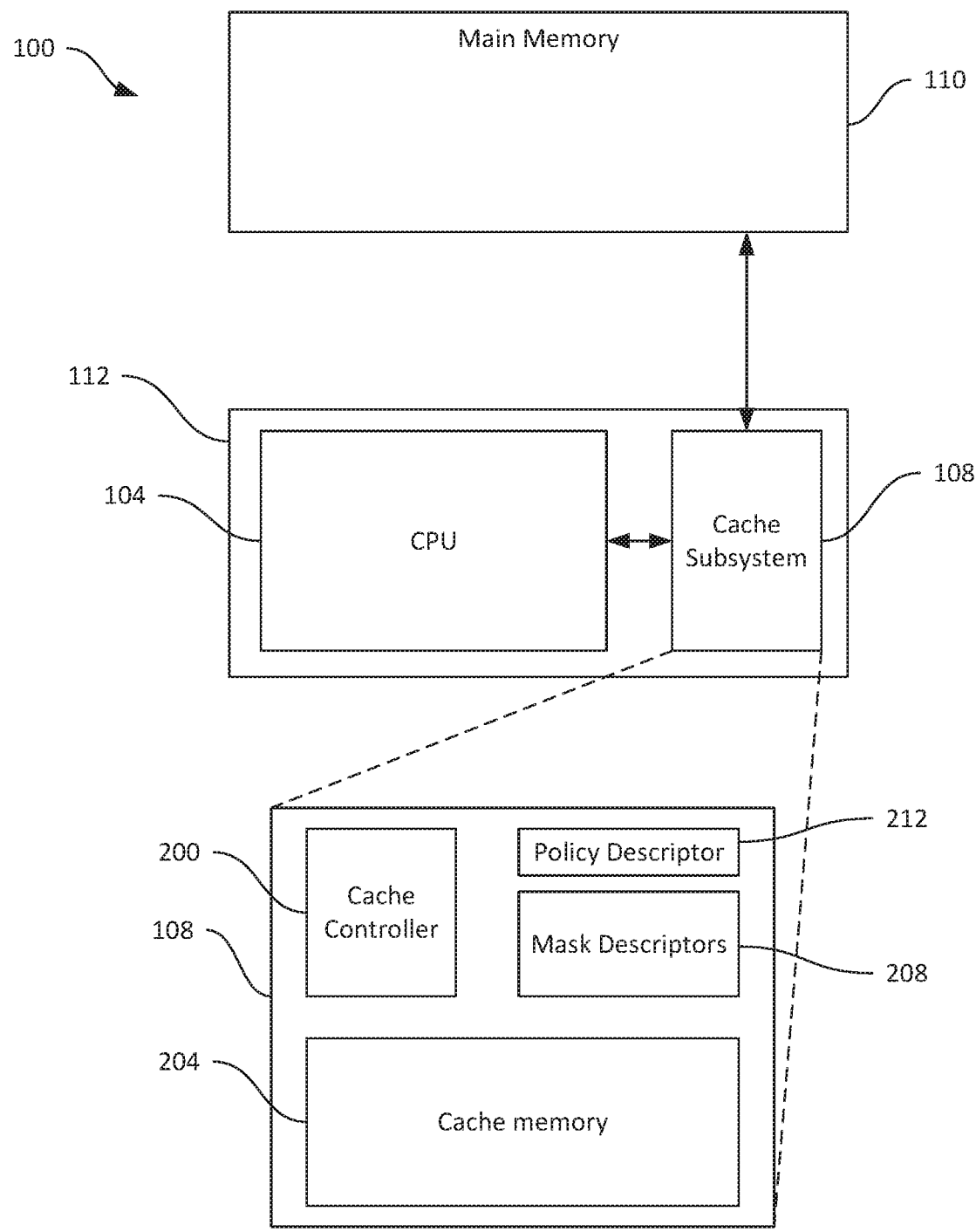
FIG. 1 depicts a cache control system, according to a non-limiting embodiment.

FIG. 1 depicts a cache control system 100 for implementation in a computing device. The nature of the computing device itself is not particularly limited. For example, the computing device may be implemented as a controller in an autonomous or semi-autonomous vehicle. In other examples, the computing device can be implemented as a controller for other suitable hardware (e.g. as an industrial process controller), as a standalone device such as a desktop computer, a tablet computer, a smartphone, and the like. As will be apparent to those skilled in the art, various components of the computing device, including input and output peripherals, physical housings and the like, are omitted from FIG. 1 for simplicity of illustration.

The system 100 includes a central processing unit (CPU) 104 and a cache subsystem 108 connecting the CPU 104 to a main memory 110 (e.g. one or more units of dynamic random access memory, DRAM), The CPU 104 and the cache subsystem 108 are implemented as one or more integrated circuits (ICs), and in the present example are shown as being implemented on a common die 112. In other examples, the cache subsystem 108 and the CPU 104 may be implemented on discrete physical substrates. The CPU 104, as referred to herein, includes various components (not shown) such as a control unit (CU), arithmetic logic unit (ALU) and the like. The cache subsystem 108, as shown in FIG. 1, includes a cache controller 200, configured to receive and execute memory transaction requests from the CPU 104 against a cache memory 204 (e.g. one or more units of static random access memory, SRAM), as well as against the main memory 110. As will be discussed in greater detail below, the cache controller 200 is configured to execute the memory transactions according to a plurality of mask descriptors 208 stored in association with the cache controller 200.

In the present example, the mask descriptors 208 are illustrated as being stored in a component of the cache subsystem 108, such as one or more registers. The registers may be implemented as portions of the cache memory 204, distinct memory circuits, or the like. In general, each mask descriptor 208 identifies a specific portion of the cache 204. In other examples, the registers containing the mask descriptors 208 may be components of the CPU 104. In still further examples, the mask descriptors 208 may be stored in dedicated configuration space in the main memory 110. The cache controller 200 is also configured, in the present example, to execute memory transactions according to a policy descriptor 212, which may be stored in another register in the cache subsystem 108 (or, as noted above in connection with the mask descriptors 208, in the CPU 104). In other examples, the policy descriptor 212 can be omitted.

Each mask descriptor 208 identifies a portion of the cache 204. As will be apparent to those skilled in the art, the cache 204 is typically accessed (by the controller 200) by reference to an index identifier. Each index identifier corresponds to one or more blocks (also referred to as lines) of cache, with each block containing one or more bytes of data. The number of blocks identified by each index identifier is dependent on the implementation of the cache 204. For example, if the cache 204 is direct-mapped, each index identifier corresponds to a single block. For set-associative cache, on the other hand, each index identifier corresponds to a plurality of blocks (e.g. two or four blocks). In the examples discussed below, it will be assumed that the cache 204 is direct-mapped and that each index identifier therefore corresponds to a single block in the cache 204. However, it will be understood that the mechanisms discussed herein can also be readily applied to set-associative cache.

Each mask descriptor 208 thus identifies a subset of the available index identifiers of the cache 204. In the present example, each mask descriptor is a bit mask or predefined length, in which each bit corresponds to a predetermined number of cache index identifiers. Referring to Table 1, an example set of three mask descriptors 208-1, 208-2 and 208-3 (collectively referred to as mask descriptors 208, and each generically referred to as a mask descriptor 208) is shown. In other examples, as few as two mask descriptors 208 may be employed. Further, a greater number of mask descriptors 208 than the three shown below may be implemented.

TABLE 1

Example Mask Descriptors

| 208-1 | 0 | 0 | 0 | 0 | 0 | 0 | 1 | 1 |
| 208-2 | 0 | 0 | 0 | 0 | 1 | 1 | 0 | 0 |
| 208-3 | 1 | 1 | 1 | 1 | 0 | 0 | 0 | 0 |

Figure 2:
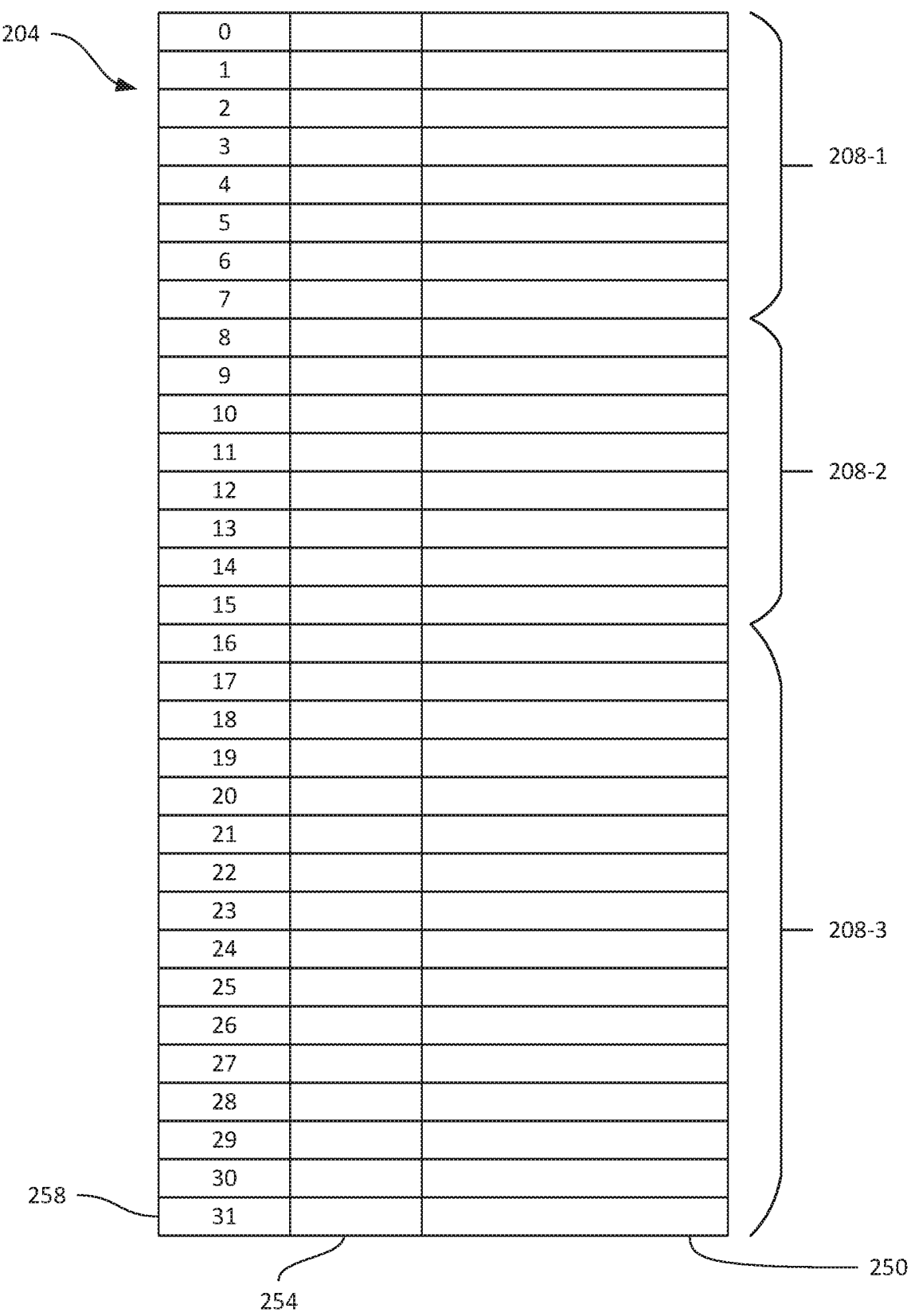
FIG. 2 depicts a cache structure deployed in the system of FIG. 1, according to a non-limiting embodiment.

As seen above, the mask descriptors 208 each contain eight bits. Each bit of each mask descriptor 208 represents the same number of index identifiers in the cache 204. The number of index identifiers represented by each bit in a mask descriptor depends on the number of bits in the mask and the number of index identifiers in the cache. In the present example, for the purpose of illustration it is assumed that the cache 204 contains thirty-two blocks, each having a distinct index identifier (i.e., a 32-block direct-mapped cache). Each bit of each mask descriptor 208 therefore represents four index identifiers (that is, 12.5% of the capacity of the cache 204). Referring to FIG. 2, the cache 204 is shown in greater detail.

In particular, FIG. 2 illustrates a plurality (thirty-two in this example, as noted above) of cache blocks 250 each having a tag 254. As will be apparent to those skilled in the art, each tag 254 typically contains at least a portion of the most-significant bits of the address in main memory 110 of the data in the corresponding block 250. The tags 254 need not be stored in the same physical memory element as the blocks 250, but are illustrated alongside the blocks 250 for simplicity. Each block 250 and corresponding tag 254 is accessed by the cache controller 200 by an index identifier 258.

Each of the mask descriptors 208 shown in Table 1 corresponds to a specific contiguous subset of the index identifiers 258 (and therefore the blocks 250) of the cache 204. Specifically, as shown in FIG. 2, the mask descriptor 208-1 corresponds to the first eight index identifiers, while the mask descriptor 208-2 corresponds to the next eight index identifiers and the mask descriptor 208-3 corresponds to the final sixteen index identifiers. As will therefore be apparent from Table 1 and FIG. 2, each mask descriptor 208 can, but is not required to, represent a different number of index identifiers 258. That is, in other examples every mask descriptor 208 can represent the same number of index identifiers 258. Further, taken together the mask descriptors 208 represent the entirety of the cache 204. Preferably, as shown in Table 1 and FIG. 2, the mask descriptors 208 do not overlap—that is, each subset of index identifiers 258 represented by a mask descriptor 208 is exclusive to that mask descriptor.

As will be apparent, in a conventional cache, a memory transaction request generated by a CPU (via the execution of an instruction which itself was previously retrieved from the cache 204 or the memory 110) contains an address of a location in the memory 110, also referred to simply as a memory address. The cache controller 200 is configured to map the memory address to a cache index identifier, typically by modular arithmetic (e.g., by selecting a predefined number of the least-significant bits of the memory address). In the examples described herein however, the cache controller 200 is configured, rather than accessing the cache 204 at an index based directly on the memory address, to generate an index identifier to access based on both the memory address and one of the mask descriptors 208. The process of index identifier generation and cache access by the controller 200 will be described in greater detail below, with reference to FIG. 3.

Figure 3:
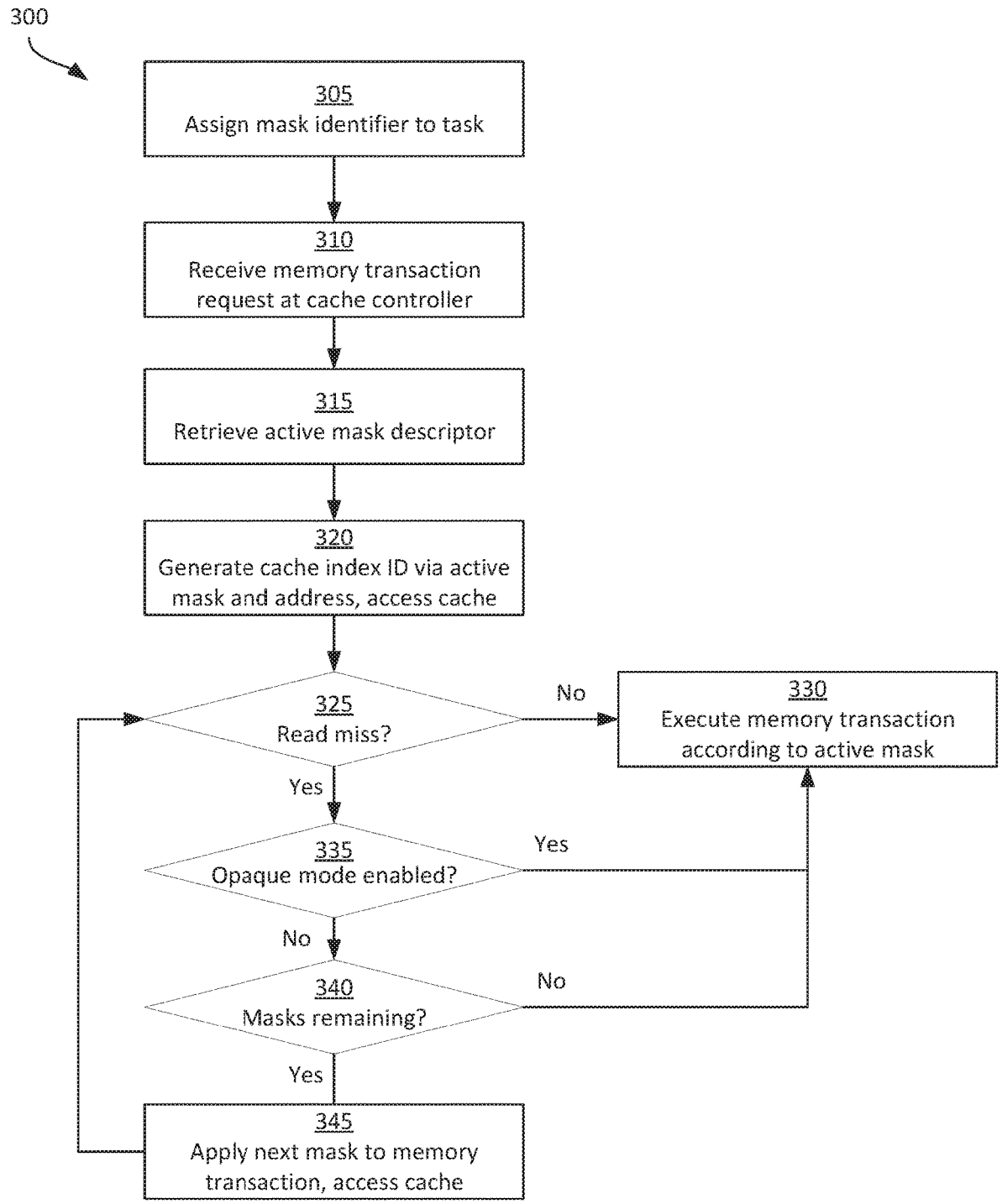
FIG. 3 depicts a method of task-based cache isolation, according to a non-limiting embodiment.

Turning to FIG. 3, a method 300 of task-based cache isolation is illustrated. The method 300 is described below in conjunction with its performance in the system 100, and specifically by the CPU 104 and the cache subsystem 108. It will be understood that the method 300 may also be performed in other suitable systems.

At block 305, the CPU 104 is configured to assign a mask identifier to a task. In the present example, the performance of block 305 is implemented via the execution, by the CPU 104, of instructions comprising an operating system of the computing device. For example, upon startup of the computing device, execution of the operating system can cause the CPU to retrieve the available mask descriptor identifiers. In the present example, the mask identifiers are "208-1", "208-2" and "208-3" as shown in Table 1. These identifiers are employed for illustrative purposes only. In practical implementations, the mask identifiers are typically, although not necessarily, simpler than those shown in Table 1. For example, for a set of three masks, the mask identifiers may be implemented as the two-bit values 00, 01, and 10.

Upon initiation of a task (e.g., responsive to activation of an input device, an instruction to launch the task generated by another task, and the like), the CPU 104 is configured, via execution of the operating system, to allocate address space in the memory 110 to the newly initiated task. The CPU 104 is also configured to assign one of the available mask identifiers to the newly initiated task. Various mechanisms may be employed to assign the mask identifier. For example, the operating system may be configured to assess one or more of the executable instructions comprising the task against predefined rules for selecting mask identifiers. In other examples, the operating system may be configured to assign mask identifiers to allocate an equal number of active tasks to each mask identifier. Other mechanisms for assigning mask identifiers to tasks upon initiation will occur to those skilled in the art.

Figure 4:
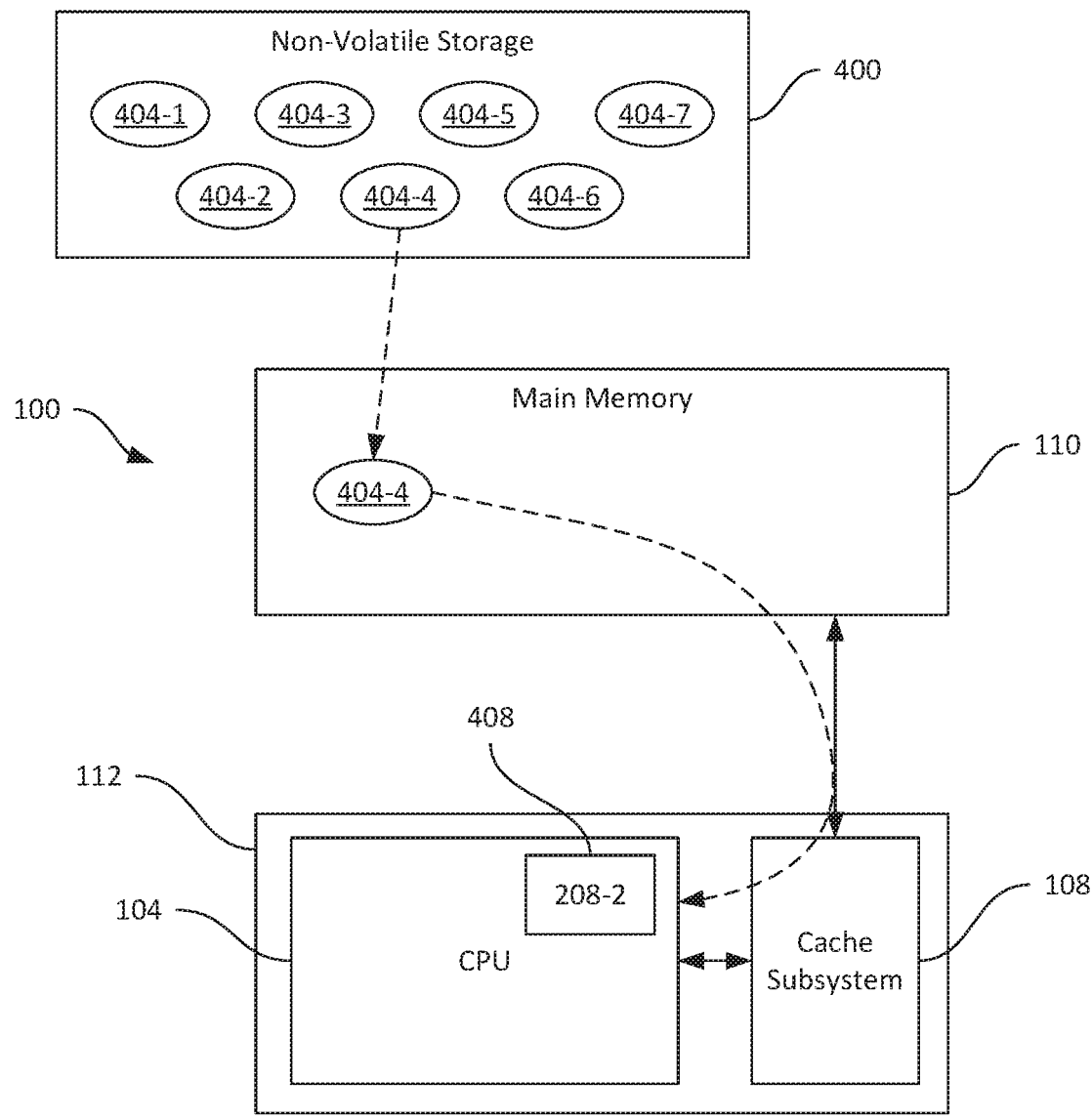
FIG. 4 depicts initiation of a task in the system of FIG. 1, according to a non-limiting embodiment.

Referring to FIG. 4, the system 100 is shown at the time of initiation of a task. In particular, a non-volatile storage device 400 (such as a hard disk or the like) is shown having stored thereon a plurality of tasks 404, also referred to as applications. Seven example tasks 404-1, 404-2, 404-3, 404-4, 404-5, 404-6 and 404-7 are shown, although it will be apparent to those skilled in the art that more or fewer tasks 404 may be present. Each task 404 consists of a plurality of instructions executable by the CPU 104. Thus, upon initiation of the task 404-4, some or all of the instructions forming the task 404-4 are transferred into the memory 110, and to the CPU 104 (typically via the cache subsystem 108) for execution by the CPU 104. The mask identifier assigned to the task 404-4 may be stored, for example, in an active task identifier register 408. The register 408 can contain additional fields, such as an address space assigned to the task 404-4. As seen in the example of FIG. 4, the mask identifier assigned to the task 404-4 is "208-2", corresponding to the second row of Table 1.

Returning to FIG. 3, at block 310 the cache controller 200 is configured to receive a memory transaction request from the CPU 104. For example, the CPU 104 may be configured, via execution of the task 404-4, to send a request to read data from a given memory address. More specifically, in the present example the CPU 104 is configured to send a request to the cache subsystem 108 to read one byte from the memory address "1100001101011011" (assuming 16-bit, byte-wise addressing—various other addressing schemes may also be implemented). The CPU 104 is configured to transmit a request to the cache controller 200 containing at least the memory address and the ask identifier assigned at block 305. The mask identifier may, for example, be retrieved from the register 408 and included in a source identifier field of the memory transaction request. As will be apparent to those skilled in the art, the source identifier field, when implemented, typically contains a fixed identifier of the hardware element originating the request (e.g. an identifier of a core of the CPU 104 that generated the request). In the present example, however, the source identifier includes the mask identifier in addition to, or instead of, a hardware source or destination identifier. For example, a 16-bit source identifier field may be populated with an 8-bit mask identifier and an 8-bit hardware identifier (e.g. the preset hardware ID of the CPU 104).

At block 315, having received the memory transaction request at block 310, the cache controller 200 is configured to retrieve, from the registers or other elements storing the descriptors 208, the active mask descriptor 208 corresponding to the mask identifier included in the request. Thus, in the present example, at block 315 the cache controller 200 is configured to retrieve the mask descriptor 208-2, which corresponds to the bit-mask "00001100". At block 315, the cache controller 200 can also be configured to retrieve the policy descriptor 212, as will be discussed in greater detail below.

At block 320, the cache controller 200 is configured to generate a cache index identifier based not only on the memory address received with the request at block 310, but also based on the active mask descriptor 208 retrieved at block 315. Referring briefly to FIG. 2, as noted earlier, conventional selection of a cache index identifier involves mapping the memory address to an index, for example by selecting the five least significant bits of the memory address. In the present example, the five least significant bits are "11011", assuming that each block 250 in the cache 204 contains a single byte and that offset bits are therefore not necessary. Thus, according to conventional mapping, the memory transaction would be executed against the block 250 corresponding to the index identifier 27. However, as seen in FIG. 2, the mask descriptor 208-2, assigned at block 305, corresponds only to the blocks 250 with the index identifiers 8 through 15. The cache controller 200 is therefore configured to implement additional functionality to map the memory address to an index identifier 258 within the subset of index identifiers 258 represented by the mask descriptor 208-2.

Figure 5:
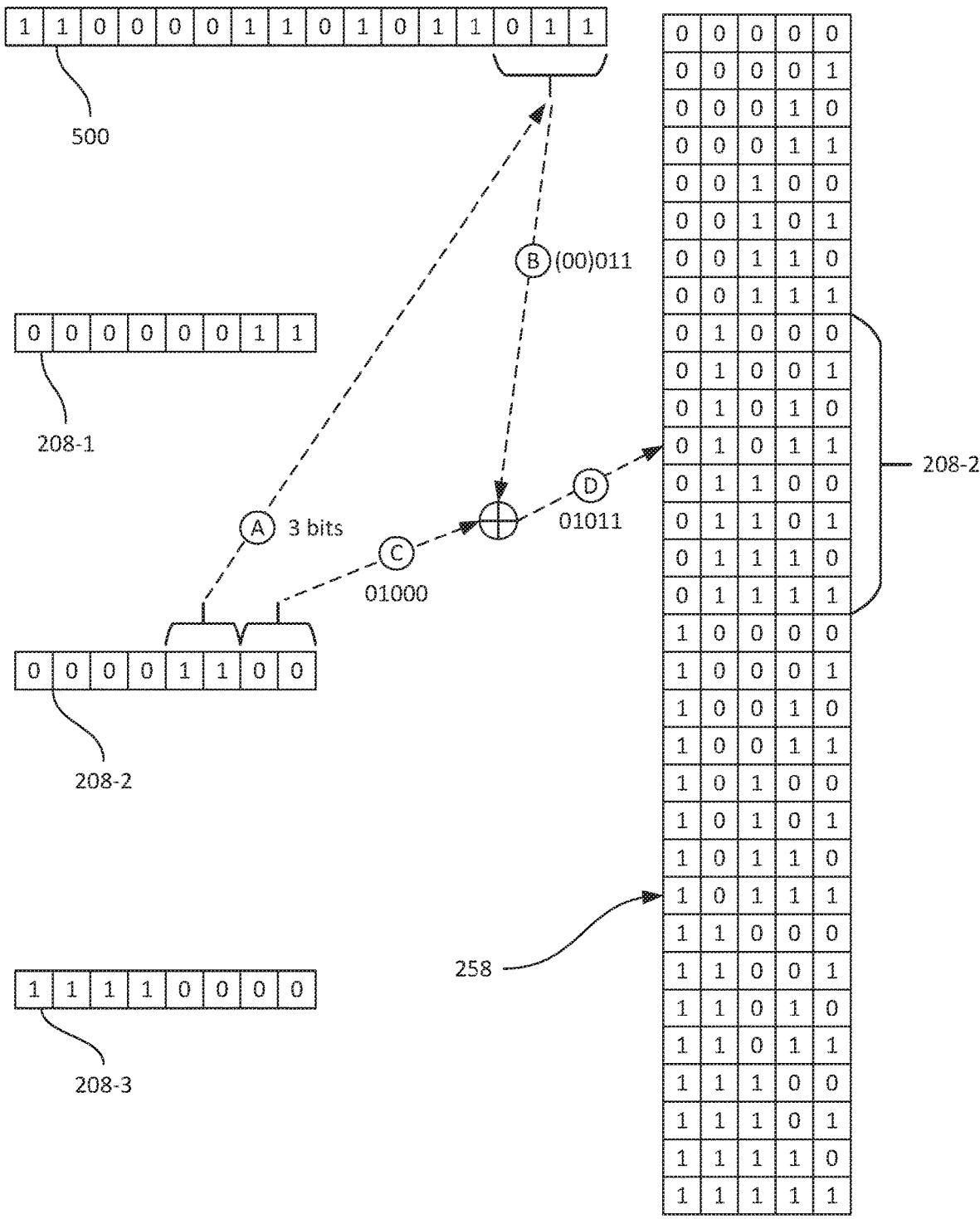
FIG. 5 depicts a performance of block 320 in the method of FIG. 3, according to a non-limiting embodiment.

Referring to FIG. 5, an example process performed by the cache controller 200 at block 320 is illustrated. As will be apparent in the discussion below, the cache controller 200 may generate an index identifier based on the mask descriptor 208 and the memory address according to various other suitable processes in addition to the process discussed herein.

A 16-bit memory address 500 is illustrated in FIG. 5, having the value mentioned above. In addition, the mask descriptors 208 are illustrated, as well as the index identifiers 258 (in binary values rather than the decimal values shown in FIG. 2). To generate the index identifier at block 320, the cache controller 200 is configured to determine a number least significant bits to select from the memory address 500. In general, mapping the memory address 500 to the index identifiers 258 involves determining the result of [memory address 500] modulo [number of index identifiers represented by the mask descriptor 208]. Thus, the cache controller 200 is configured to determine the number of bits from the address 500 based on the number of index identifiers represented by the mask descriptor 208. In the present example, the mask descriptor 208-2 represents eight index identifiers 258, and thus three bits of the memory address 500 are required, as shown in stage "A", The three least significant bits "011" are retrieved from the address 500 at stage "B". As noted earlier, it is assumed in the present example that no offset bits are required, as each block 250 of the cache 204 contains a single byte.

The cache controller 200 is further configured to determine a starting index identifier 258 for the mask descriptor 208-2. The starting index identifier 258 is determined based on the number of least significant zeroes in the mask descriptor 208-2. In the present example, the mask descriptor 208-2 includes two least significant zeroes, indicating that the subset of index identifiers 258 represented by the mask descriptor 208-2 begins after the first eight index identifiers 258 (i.e. skips the first eight indices in the cache 204). The starting index identifier is therefore 8, (i.e. 01000). The starting index identifier, shown at stage "C" in FIG. 5, is added to the three least significant bits retrieved from the address 500, to produce the final index identifier "01011", shown at stage D. Thus, the cache controller 200 generates an active index identifier falling within the subset of index identifiers 258 represented by the mask descriptor 208-2.

Having generated the active index identifier, the cache controller 200 is configured to access the cache 204 according to the active index identifier to execute the memory transaction request received at block 310. The execution of the memory transaction can include retrieval if the tag 254 corresponding to the relevant index identifier contains a tag matching a predetermined number of the most significant bits of the address 500, as well as any necessary retrieval from memory 110 and/or eviction of other data from the cache 204. In other words, the execution of the memory transaction may generate further memory transactions (e.g. for eviction and replacement with the data requested at block 310). As will now be apparent, such further memory transactions also include the mask descriptor identifier "208-2", and are therefore also restricted to the subset of index identifiers 258 represented by the mask descriptor 208-2.

In embodiments in which the policy descriptor 212 is omitted, the performance of method 300 ends as set out above. In other embodiments, however, the cache controller 200 is also configured to retrieve the policy descriptor at block 315. Further, the cache controller 200 is configured to execute the requested memory transaction according to the policy descriptor at block 320 and subsequent blocks of the method 300, as discussed below.

The policy descriptor 212 can be implemented, as with the mask descriptors 208, as a register in the cache subsystem 108, the CPU 104, or as dedicated address space (e.g. in the memory 110). The policy descriptor 212 contains at least an indication of whether an opaque cache mode is enabled. The opaque mode indication dictates whether memory transactions are strictly limited to accessing the cache 204 only at index identifiers 258 represented by the active mask descriptor 208. When the opaque mode is disabled, certain memory transactions may be permitted to access the cache 204 outside the purview of the active mask descriptor 208. An example policy descriptor 212 is shown below in Table 2.

TABLE 2

Example Policy Descriptor 212

| Opaque Mode Enabled | Priority Direction | Eviction Policy |
|---|---|---|
| 0 | 0 | 01 |

As shown above, the policy descriptor includes an opaque mode indicator, indicating whether the above-mentioned opaque mode is enabled. In the example above, the indicator value of "0" indicates that opaque mode is disabled (a value of "1" indicating that opaque mode is enabled—a wide variety of other indicator values may also be employed). The policy descriptor 212 also includes a priority direction, which indicates one of two directions through which the cache controller 200 will traverse the mask descriptors 208 under specific conditions, discussed below. Further, the policy descriptor 212 can include an indicator of an eviction policy to apply to memory transactions. For example, the eviction policy indicator may have a value of "01" corresponding to a least recently used (LRU) eviction policy. Other values may be assigned to other eviction policies (e.g. least frequently used or LFU, first in first out of FIFO, and the like). The policy descriptor 212 can also include additional indicators not shown above. For example, the policy descriptor 212 can be contained in a 32-bit register, with the remaining bits (beyond the four bits shown above) being reserved for additional cache management policy parameters.

At block 325, the cache controller 200 is configured to determine whether execution of the memory transaction request received at block 310 has resulted in a missed read operation. That is, when the tag 254 corresponding to the index identifier selected in FIG. 5 does not contain the most significant bits of the address 500, the determination at block 325 is affirmative. Otherwise, the determination at block 325 is negative, and execution of the memory transaction proceeds as noted above.

When the determination at block 325 is affirmative, the cache controller 200 is configured to determine whether the policy descriptor 212 indicates that the opaque mode is enabled. When the determination at block 335 is affirmative, the cache controller 200 is not permitted to access portions of the cache outside that defined by the mask descriptor 208-2, and the performance of method 300 proceeds to block 330. As will be apparent to those skilled in the art, following a missed read operation, at block 330 the cache controller 200 may evict data from the cache 204 and load the data requested at block 310 into the cache 204, accessing only portions of the cache 204 within the active mask descriptor 208-2.

When the determination at block 335 is negative, however (i.e. when opaque mode is disabled), the performance of method 300 proceeds to block 340 rather than directly to block 330. At block 340, the cache controller 200 is configured to whether any of the mask descriptors 208 have not yet been employed in connection with execution of the memory transaction. In the present example performance of the method 300, the determination at block 340 is affirmative, as only the active mask descriptor 208-2 has been applied to the memory transaction.

The cache controller 200 is therefore configured to proceed to block 345, and apply the next mask descriptor 208 to the memory transaction and repeat the read operation. In other words, when the opaque policy is disabled, certain memory transactions (read operations, in the present example) are permitted to access the cache 204 outside the purview of the mask descriptor 208 assigned to the task 404 that originated the transaction.

The next mask is selected according to the priority direction indicator in the policy descriptor 212. In the present example, the priority direction indicator shown in Table 2 has a value of 0, indicating that the next mask to be selected at block 345 is the mask below that retrieved at block 315. The implementation of the priority direction indicator is not particularly limited—any assignment between priority direction indicators and direction of travel through the mask descriptors 208 may be employed.

Figure 6:
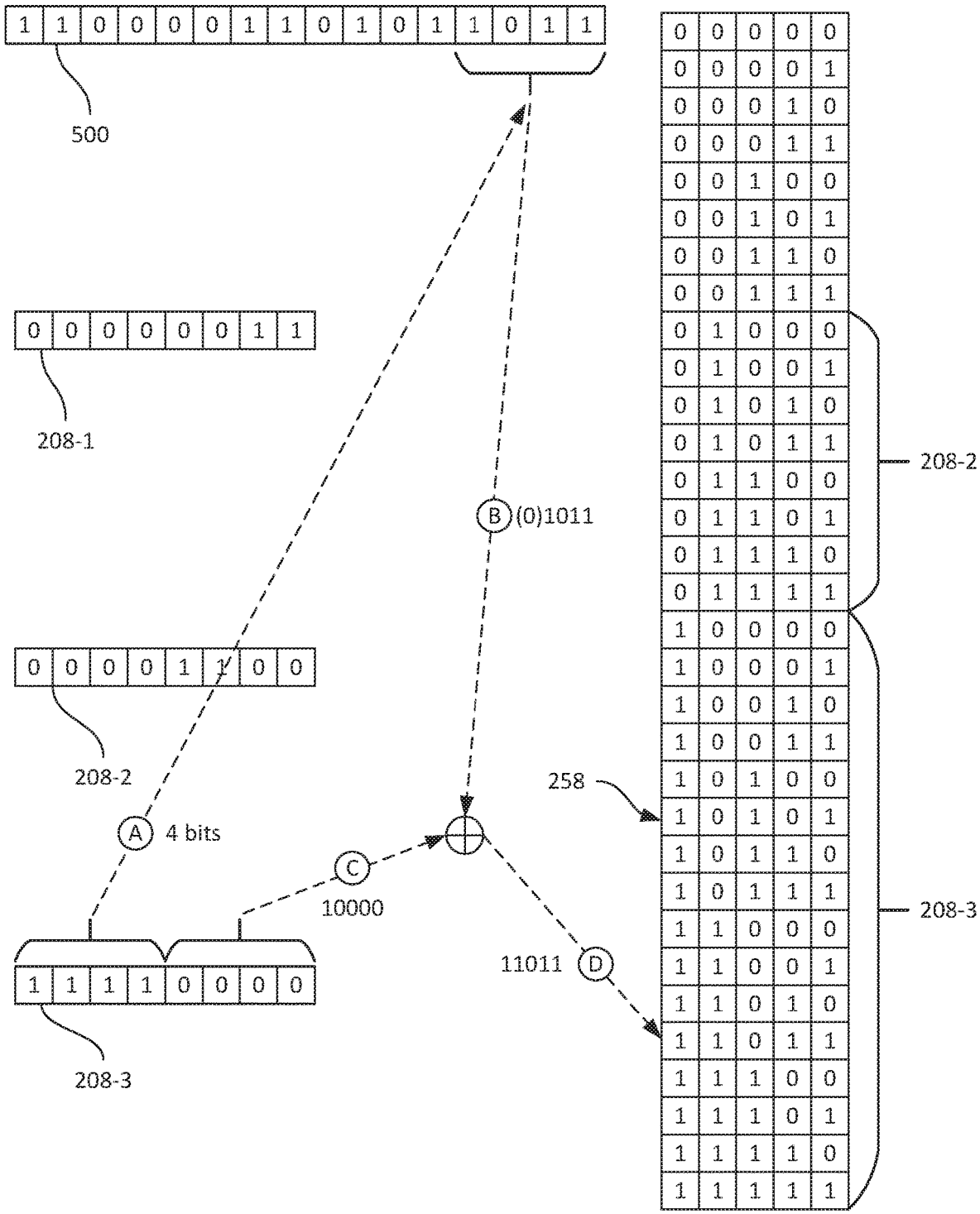
FIG. 6 depicts a performance of block 345 in the method of FIG. 3, according to a non-limiting embodiment.

In the present example, therefore, at block 345 the cache controller 200 is configured to retrieve the mask descriptor 208-3 and repeat the generation of an index identifier based on the address 500 and the mask descriptor 208-3. The generation of an index identifier at block 345 is shown in FIG. 6, following the process discussed above in connection with FIG. 5. As shown in FIG. 6, the resulting index identifier is the twenty-seventh (11011) index identifier 258 in the cache 204.

Returning to FIG. 3, at block 345 the cache controller 200 is configured to repeat the read operation that missed in the previously, and repeat the determination at block 325. As will now be apparent, the blocks 325, 335, 340 and 345 permit the cache controller 200 to access portions of the cache 204 other than those specified by the active mask descriptor (208-2 in the present example), preferably for transactions (such as read operations) that do not affect the contents of the cache 204. If the determination at block 325 is negative again, the cache controller may repeat the above process, using the mask descriptor 208-1. If a subsequent determination at block 340 is negative, indicating that every available mask descriptor 208 has been employed in an attempt to locate the requested data in the cache 204, performance of the method 300 proceeds to block 330, at which eviction and filling are performed as necessary, under the active mask 208-2 (i.e. not the masks 208 employed in successive performances of block 345).

As will be apparent from the discussion above, certain tasks 404 may be isolated from affecting certain other tasks 404 in the cache 204. As seen in FIG. 4, the number of tasks 404 may exceed the number of available masks 208, and therefore each task 404 need not be assigned a unique mask descriptor 208. Some tasks 404, in other words, may not be isolated from one another. However, a degree of flexibility in determining which tasks 404 may interfere with which other tasks 404 may be granted by the system described herein.

Variations to the above systems and methods are contemplated. For example, a wide variety of mask descriptors 208 may be employed in the system 100. The length of the mask descriptors may be varied; for example, in another embodiment with a one-megabyte (1048576 bytes), 4-way set associative cache 204 in which each block 250 contains 64 bytes, any suitable number of mask descriptors 208 (e.g. four) may be implemented, for example in 32-bit registers. In such an embodiment, each bit in a mask descriptor 208 corresponds to 128 index identifiers (each corresponding to a cache set of 4 blocks, or 256 bytes) of a total of 4096 index identifiers. In other words, each bit of a mask descriptor 208 represents 3.125% of the capacity of the cache 204. More generally, the mask descriptors 208 may vary in size up to and including one mask bit per index identifier 258, and down to only two bits. In further embodiments, at the cost of increased risk of interference between tasks 404, the mask descriptors 208 may represent overlapping portions of the cache 204.

The scope of the claims should not be limited by the embodiments set forth in the above examples, but should be given the broadest interpretation consistent with the description as a whole.

The invention claimed is:

1. A method of task-based cache isolation, comprising:
   storing, in association with a cache controller, (i) a plurality of mask descriptors representing respective predetermined sets of index identifiers of a cache memory, and (ii) for each mask descriptor, a mask identifier;
   receiving, at the cache controller, a memory transaction request containing a memory address and an active one of the mask identifiers;
   retrieving, at the cache controller, an active one of the mask descriptors corresponding to the active mask identifier;
   generating, based on the memory address and the active mask descriptor, an index identifier corresponding to a cache element within the portion of the cache memory represented by the active mask descriptor; and
   applying the memory transaction to the cache memory at the index identifier.

2. The method of claim 1, wherein the respective portions of the cache memory do not overlap.

3. The method of claim 1, wherein the respective portions of the cache memory collectively comprise the entire cache memory.

4. The method of claim 1, wherein each mask descriptor comprises a plurality of bits, each bit representing an equal subset of cache memory index identifiers.

5. The method of claim 1, wherein the memory transaction request contains a memory address field and a source identifier field containing the active mask identifier.

6. The method of claim 5, wherein the source identifier field further contains a hardware source identifier.

7. The method of claim 1, further comprising:
   responsive to a missed read operation, retrieving a secondary mask and repeating the generation of an index identifier and the application of the memory transaction.

8. A system for task-based cache isolation, comprising:
   a cache memory;
   a mask storage device storing (i) a plurality of mask descriptors representing respective predetermined sets of index identifiers of a cache memory, and (ii) for each mask descriptor, a mask identifier;
   a cache controller connected with the cache memory and the mask storage device, the cache controller configured to:
      receive a memory transaction request containing a memory address and an active one of the mask identifiers;
      retrieve an active one of the mask descriptors corresponding to the active mask identifier;
      generate, based on the memory address and the active mask descriptor, an index identifier corresponding to a cache element within the portion of the cache memory represented by the active mask descriptor; and
      apply the memory transaction to the cache memory at the index identifier.

9. The system of claim 8, wherein the respective portions of the cache memory do not overlap.

10. The system of claim 8, wherein the respective portions of the cache memory collectively comprise the entire cache memory.

11. The system of claim 8, wherein each mask descriptor comprises a plurality of bits, each bit representing an equal subset of cache memory index identifiers.

12. The system of claim 8, wherein the memory transaction request contains a memory address field and a source identifier field containing the active mask identifier.

13. The system of claim 12, wherein the source identifier field further contains a hardware source identifier.

14. The system of claim 8, the cache controller further configured to:
   responsive to a missed read operation, retrieve a secondary mask and repeat the generation of an index identifier and the application of the memory transaction.

15. A non-transitory computer-readable storage medium storing a plurality of instructions for execution by a cache controller to:
- store, in association with a cache controller, (i) a plurality of mask descriptors representing respective predetermined sets of index identifiers of a cache memory, and (ii) for each mask descriptor, a mask identifier;
- receive, at the cache controller, a memory transaction request containing a memory address and an active one of the mask identifiers;
- retrieve, at the cache controller, an active one of the mask descriptors corresponding to the active mask identifier;
- generate, based on the memory address and the active mask descriptor, an index identifier corresponding to a cache element within the portion of the cache memory represented by the active mask descriptor; and
- apply the memory transaction to the cache memory at the index identifier.

16. The non-transitory computer-readable storage medium of claim 15, wherein the respective portions of the cache memory do not overlap.

17. The non-transitory computer-readable storage medium of claim 15, wherein the respective portions of the cache memory collectively comprise the entire cache memory.

18. The non-transitory computer-readable storage medium of claim 15, wherein each mask descriptor comprises a plurality of bits, each bit representing an equal subset of cache memory index identifiers.

19. The non-transitory computer-readable storage medium of claim 15, wherein the memory transaction request contains a memory address field and a source identifier field containing the active mask identifier.

20. The non-transitory computer-readable storage medium of claim 19, wherein the source identifier field further contains a hardware source identifier.

21. The non-transitory computer-readable storage medium of claim 15, wherein execution of the instructions further configures the cache controller to:
- responsive to a missed read operation, retrieve a secondary mask and repeal the generation of an index identifier and the application of the memory transaction.

* * * * *